United States Patent
Jakubowski

(10) Patent No.: US 8,235,629 B2
(45) Date of Patent: Aug. 7, 2012

(54) SUBMERGED FLOATING FOUNDATION WITH BLOCKED VERTICAL THRUST AS SUPPORT BASE FOR WIND TURBINE, ELECTROLYSER AND OTHER EQUIPMENT, COMBINED WITH FISH FARMING

(75) Inventor: Martin Jakubowski, Hanau (DE)

(73) Assignee: Blue H Intellectual Property Cyprus Ltd., Nicosia (CY)

( * ) Notice: Subject to any disclaimer, the term of this patent is extended or adjusted under 35 U.S.C. 154(b) by 399 days.

(21) Appl. No.: 12/703,827

(22) Filed: Feb. 11, 2010

(65) Prior Publication Data

US 2010/0150664 A1    Jun. 17, 2010

Related U.S. Application Data

(63) Continuation of application No. 11/576,825, filed as application No. PCT/IB2005/002950 on Oct. 4, 2005, now abandoned.

(30) Foreign Application Priority Data

Oct. 6, 2004  (IT) ............................... BA2004U0027

(51) Int. Cl.
    *B63B 21/50*    (2006.01)
(52) U.S. Cl. ............. 405/224; 290/44; 290/55; 119/223
(58) Field of Classification Search .................. 119/208, 119/223, 238–241; 405/203, 205, 224; 290/44, 290/55

See application file for complete search history.

(56) References Cited

U.S. PATENT DOCUMENTS

| | | | |
|---|---|---|---|
| 2,394,764 | A | 2/1946 | Greulich |
| 4,645,379 | A | 2/1987 | Grimsley et al. |
| 4,764,313 | A | 8/1988 | Cameron et al. |
| 5,412,903 | A | 5/1995 | Zemach et al. |
| 5,617,813 | A | 4/1997 | Loverich et al. |

(Continued)

FOREIGN PATENT DOCUMENTS

DE    10219062 A1    11/2003

(Continued)

OTHER PUBLICATIONS

PCT International Search Report (ISR) dated Apr. 11, 2007 in PCT International Application No. PCT/IB2005/002950.

(Continued)

*Primary Examiner* — Sunil Singh
(74) *Attorney, Agent, or Firm* — Timothy X. Gibson, Esq.; Gibson & Dernier LLP

(57) ABSTRACT

A submerged buoyant floating platform with blocked vertical thrust. Above the platform an electrolyser may be placed inside a hollow container. Under the platform may be a hollow container filled with ballast, connected by pipes or chains to the outer ring of the platform which provide rigidity to the entire structure. A storage tank for the hydrogen produced by the electrolyser may be attached to the hollow container. The entire structure may be anchored with chains attached to bottom weights sitting on the ocean floor. The structure may be used as a support for a tower including a wind turbine. Additional chains attached to the structure bottom weights on the sea floor may link the structure to an aquaculture facility and to floats which hold the cages used in aquaculture. The floats may be linked to additional bottom weights placed on the sea floor.

20 Claims, 1 Drawing Sheet

U.S. PATENT DOCUMENTS

| | | | |
|---|---|---|---|
| 5,873,678 A | 2/1999 | Moses | |
| 5,961,251 A | 10/1999 | Prendergast | |
| 6,027,286 A | 2/2000 | Pollack | |
| 6,164,872 A | 12/2000 | Morishige | |
| 6,347,910 B1 | 2/2002 | Morishige | |
| 6,481,378 B1 | 11/2002 | Zemach | |
| 6,554,534 B1 | 4/2003 | Butterfield | |
| 6,773,207 B2 | 8/2004 | Mathis | |
| 7,075,189 B2 * | 7/2006 | Heronemus et al. | 290/44 |
| 7,156,586 B2 | 1/2007 | Nim | |
| 7,476,074 B2 | 1/2009 | Jakubowski et al. | |
| 2003/0168864 A1 | 9/2003 | Heronemus et al. | |
| 2004/0169376 A1 * | 9/2004 | Ruer et al. | 290/55 |
| 2005/0155346 A1 | 7/2005 | Nikolaus | |
| 2006/0062676 A1 | 3/2006 | Jakubowski et al. | |
| 2006/0082160 A1 * | 4/2006 | Lee | 290/55 |
| 2008/0089746 A1 | 4/2008 | Jakubowski | |
| 2010/0194115 A1 * | 8/2010 | Jakubowski et al. | 290/55 |
| 2010/0219645 A1 * | 9/2010 | Yamamoto et al. | 290/55 |

FOREIGN PATENT DOCUMENTS

| | | | |
|---|---|---|---|
| DE | 10241636 A1 | 3/2004 | |
| EP | 0867565 A1 | 9/1998 | |
| EP | 1106825 A2 | 6/2001 | |
| EP | 1174336 A1 | 1/2002 | |
| EP | 1288122 A2 | 3/2003 | |
| EP | 1348867 A1 | 10/2003 | |
| GB | 849887 A | 9/1960 | |
| GB | 2378679 A | 2/2003 | |
| JP | H05-103560 A | 4/1993 | |
| JP | 2001-248535 A | 9/2001 | |
| JP | 2002-285951 A | 10/2002 | |
| JP | 2002-285952 A | 10/2002 | |
| JP | 2002-303454 A | 10/2002 | |
| WO | 01/73292 A1 | 4/2001 | |
| WO | 02/10589 A1 | 2/2002 | |
| WO | 03/029649 A1 | 4/2003 | |
| WO | 03/098037 A1 | 11/2003 | |
| WO | 2004/015207 A1 | 2/2004 | |
| WO | 2004/055272 A2 | 7/2004 | |
| WO | 2004/061302 A2 | 7/2004 | |
| WO | 2004/055272 A3 | 8/2004 | |
| WO | 2006/038091 A3 | 6/2006 | |
| WO | 2009/050547 A2 | 4/2009 | |

OTHER PUBLICATIONS

International Preliminary Report on Patentability (IPRP) written opinion dated Apr. 11, 2007 in PCT International Application No. PCT/IB2005/002950.

* cited by examiner

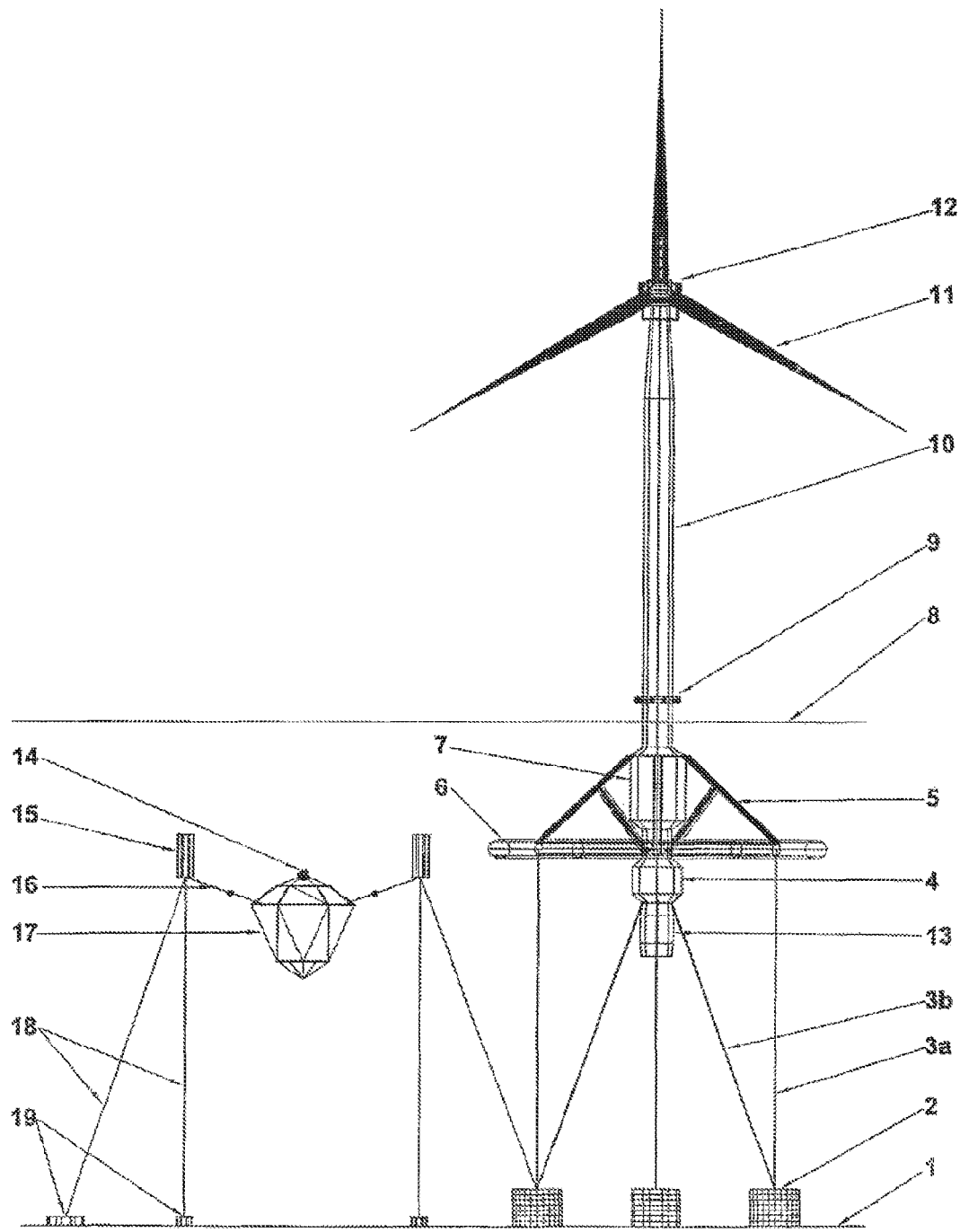

SUBMERGED FLOATING FOUNDATION WITH BLOCKED VERTICAL THRUST AS SUPPORT BASE FOR WIND TURBINE, ELECTROLYSER AND OTHER EQUIPMENT, COMBINED WITH FISH FARMING

CROSS-REFERENCE TO RELATED APPLICATIONS

This application claims benefit as a Continuation of U.S. application Ser. No. 11/576,825 filed on Apr. 6, 2007, which is a 35 U.S.C. 371 national stage entry of PCT International App. No. PCT/IB2005/002950 filed on Oct. 4, 2005, claiming benefit of priority to Italian application no. BA2004U000027 filed on Oct. 6, 2004; the entirety of prior U.S. application Ser. No. 11/576,825 and of PCT International Application Ser. No. PCT/IB2005/002950 are expressly incorporated herein by reference, for all intents and purposes, as if identically set forth herein.

BACKGROUND OF THE INVENTION

The present invention relates to the combination of innovative techniques for the construction of a submerged floating foundation, to be used as a submerged support base for a wind turbine and for an electrolyser, and with the possibility of utilizing the entire submerged facility to house additional equipment; the entire structure to be combined with fish farming facilities, placed in the immediate vicinity of the foundation and attached permanently to the foundation with various cables or ropes.

The innovative content does not only relate to the creation, at a depth below the area affected by wave movements, in fresh or sea waters, of a submerged floating foundation, by itself a technical innovation in view of the method used for executing the work, but also to the use of the structure to house an electrolyser for the electrolysis of water and the production and storage of hydrogen, together with all the equipment required to carry out these activities. A second innovation relates to the particular method used to make the structure rigid through the use of chains and pipes, and to the particular method used to stabilize the foundation by using bottom-weights. Furthermore, the particular method of anchoring the structure to the sea floor permits the positioning and the realization of a fish farming facility.

SUMMARY OF THE INVENTION

In accordance with versions of the present invention methods and apparatus are provided as follows. A method of positioning linking chains or pipes, preferable on the upper part of the foundation, but possibly both on the upper and lower parts of the foundation, as links, in order to make more rigid and stable a submerged floating foundation with blocked vertical thrust.

A method of attaching the submerged floating foundation with blocked vertical thrust, to bottom-weights placed on the sear floor using steel chains placed diagonally so as to stop and neutralize possible horizontal shifts and therefore provides additional stability.

A method of placing a counter-weight below the submerged floating foundation with blocked vertical thrust, thus moving the centre of gravity of the whole structure below its centre of rotation, thus avoiding and neutralizing possible external forces which may otherwise cause rotation and tipping over of the structure.

A method of installing and positioning of a cylinder or floating tank, above the submerged foundation and fastened to the foundation.

A method of using the above named floating tank as a container for the electrolyser.

A method of installing and positioning of a reservoir below the foundation, fastened to the counterweight described above, and used for storage of the hydrogen produced by the electrolyser.

A method of anchoring the foundation, using suitable steel cables or chains connecting vertically and diagonally the foundation to submerged hollow bodies buried in the sand below the sea floor, and filled with rubble and sand.

A method of creating a submerged floating facility for fish farming, made of cages for the breeding of various types of fish, fixed with ropes or chains to floats on the sea surface.

A method of attaching the submerged cages to floats using pullable ropes or chains.

A method of anchoring the floats with ropes to bottom-weights on the sea floor.

A method of connecting the floats to the bottom-weights holding the submerged floating foundation in place, so as to create a single multi-purpose installation, entirely or partially submerged.

A method of combining, using innovative techniques, design and construction methods, a submerged floating foundation with blocked vertical thrust used as a support base for a tower holding a wind turbine, with a facility for the production of hydrogen, placed above the foundation, and with a facility for storage of hydrogen placed below the foundation, and furthermore combining the use of the bottom-weights to anchor the foundation and the entire structure to the sea floor and to attach floats which hold by means of ropes or chains cages used for fish farming.

DESCRIPTION OF THE INVENTION

The invention may include the following elements described and evidenced in the attached drawing FIG. 1.

As illustrated in FIG. 1, the foundation 6 may comprise a horizontal ring hexagonal body built in concrete, or preferably in steel.

At the centre of the foundation 6 are attached two bodies 4, 7, one on the upper side, pointing towards the sea surface 8 and one on the lower side, pointing towards the ocean floor 1.

The upper body is a hollow, buoyant body 7 containing an electrolyser for the production of oxygen and hydrogen 7. In the same hollow body 7 are placed one or more tanks for the storage of the oxygen produced by electrolysis. This hollow body 7 is also the support base for a tower 10, to which a working platform 9 above the sea level is attached, which allows access to the inside of the tower 10.

On top of the tower 10 a nacelle 12 is positioned containing the turbine and its accessories; the nacelle 12 contains the rotor, the revolutions multiplier and the generator 11. All these items rest, without interruption, on the foundation 6, which provides a support base for the turbine and the electrolyser. The lower body includes first a hollow body 4, cylindrical or polygonal, full or filled with ballast. This body 4 acts as a counterweight to stabilize foundation movements. To this first body 4 is permanently attached a second hollow body 13, preferably of spherical shape (or polygonal or cylindrical), to be used—also, if needed, with the hollow body of the foundation 6—as a reservoir for the storage of the hydrogen produced by the electrolyser.

Inside the structure run the cables for the transmission of electricity from the nacelle 12 and the pipes for the transport of hydrogen from the electrolyser to the storage containers; from the main body go off the cables and the pipes for the transmission of the electricity, hydrogen and oxygen produced either directly to shore or towards intermediate structures, such as ships or other storage and transport facilities.

The entire structure is designed to stand against external natural forces (wind, waves, currents, tides) through the joint and combined action of two forces: the force, based on Archimedes principle, which pushes the structure upwards vertically, and the reaction produced by the anchoring chains 3a, which pulls the structure downwards; these two forces, however, are not sufficient to ensure the absolute stability of the foundation 6, necessary for the correct working of the turbine.

In order to make the structure more rigid and better able to resist horizontal external forces (and to prevent capsizing), in addition to positioning the central ballast in the lower hollow body 4 below the foundation 6, further precautions have been added. These are shown in the drawing as links, for example rigid metal pipes 5 (although reinforced cement is also possible), placed above the foundation and fastened to the top of the upper buoyant hollow body 7. It is possible that these pipes 5 will be replaced by other links such as chains attached on the upper part in the same manner as the pipes, or also attached to the lower hollow body 4 below the foundation 6 and also to the hydrogen reservoirs 13.

The entire structure is attached with cables or preferably by chains to bottom-weights 2, placed on the sea floor 1. To the outside rim of the foundation 6 are attached the main vertical anchoring chains 3a that tie the foundation to the bottom-weights 2 at the bottom of the sea 1. From the central ballast 4 go off additional chains 3b placed diagonally 3b, also attached to the bottom-weights 2, whose function is to off-set and prevent any horizontal shifting of the structure.

Further innovation is represented by the new positioning system for the fish farming installation. The installation is no longer positioned above the foundation 6 but on its side. More precisely, from each main bottom-weight 2 placed on the sea floor 1 go off some anchoring ropes, which connect the bottom-weight 2 to floats 15 which are themselves connected through additional anchoring ropes 18 to other bottom-weights 19 on the sea floor 1. From the floats 15 go off ropes 16 which connect the floats 15 to the fish farming installation, which includes a cage 17 on top of which is placed the dispenser 14 used to provide fish-food inside the cage 17. The foundation 6 may be anchored, using suitable steel cables or chains connecting vertically 3a and diagonally 3b the foundation to submerged hollow bodies buried in the sand below the sea floor, and filled with rubble and sand.

APPLICATION SCOPE

The scope for the use of this technology is almost unlimited. In fact, in addition to its application to the production of electricity, of hydrogen and of oxygen, it includes aquaculture. Furthermore, thanks to the characteristics of the foundation and of the structure resting on it, it can be used as a meteorological station, as a substation, or as a facility for the storage of energy, hydrogen and oxygen and more generally for other activities in the open sea.

ADVANTAGES AND INNOVATIVE CONTENT OF THE INVENTION

Existing technologies do not foresee such combination of inventions, which are anyway innovative in their own right.

As a matter of fact, the method of construction of the submerged foundation is totally innovative, as it creates a stable structure able to withstand and compensate automatically the impact of all natural forces acting at the site where the foundation is located (winds, waves, marine currents, tides of any foreseeable intensity).

In addition, using the structure to house a facility to produce and stock hydrogen and oxygen is very innovative. Furthermore it is possible to use the produced and stored oxygen to oxygenize the water in the fish farming facility and to produce electrical energy using fuel cells placed inside the hollow body 7 above the foundation 6, which recombining oxygen and hydrogen previously created by electrolysis can produce electricity.

The innovative content of the fish farming facility comprises various elements. Firstly, the method of construction is greatly changed by the current invention. Secondly, the fact that the facility uses the submerged floating foundation as its primary anchoring support provides greater stability and allows the breeding of any fish species in open and deep waters. Thirdly, the described facility may be completely automatic with regard to the feeding of the fish and the oxygenation of the water.

The main technical aspects of this innovative construction, although combined to create a single structure, each reflect innovative and autonomous methodologies in their own right, which, if used in combination among them result in the creation of a single facility, with economic advantages and lower costs.

Such a combined facility allows the use of a single structure to generate at least three revenue streams from: the turbine (electricity), the electrolyser (hydrogen) and the aquaculture plant (sea food). Also innovative is the fact that a limited amount of space is used to generate substantial financial benefits, while totally respecting the environment.

Various phases in the implementation of the project may be carried out at different times and be subject to changes and modifications, to take account of the geography of the site.

Finally, it should be noted that the invention is not limited to the abovementioned versions and working examples. Further developments, modifications and combinations are also within the scope of the patent claims and are conceivable for the person skilled in the art from the above disclosure. Accordingly, the techniques and structures described and illustrated herein should be understood to be illustrative only and not limiting upon the scope of the present invention. The scope of the present invention is defined by the appended claims, including known equivalents and unforeseeable equivalents at the time of filing of this application.

What is claimed is:

1. A wind turbine assembly for fresh or seawater bodies, comprising:
    a submerged, horizontally disposed ring foundation member, said foundation member having positive buoyancy;
    an upper body fastened centrally to said foundation member and extending upwards towards a water body surface, said upper body including a cylindrical portion, said upper body having positive buoyancy, said upper body including a top end;
    a plurality of top links arranged circumferentially around and connected to said foundation member, said plurality of top links connected to said top end of said upper body to increase rigidity of the wind turbine assembly;
    a tower connected to said top end of said upper body, said tower extending from said top end of said upper body to above the water body surface;

a nacelle connected to said tower, said nacelle receiving a turbine rotor, said nacelle housing a revolutions multiplier driven by said rotor;

said revolutions multiplier operatively connected to drive an electric generator;

an electrolyser configured to produce oxygen and hydrogen from the water body, said electrolyser powered by current from said electric generator, said electrolyser housed in said upper body;

a lower body fastened centrally to said foundation member and extending downwards toward the water body bottom, said lower body including a cylindrical portion, said lower body having negative buoyancy, and ballast filling said lower body and locating the center of gravity of the wind turbine assembly below the assembly center of rotation, said lower body having a bottom;

a second cylindrical body attached to said bottom of said lower body, said second cylindrical body extending downwards toward the water body bottom, said second cylindrical body including a reservoir for storing the hydrogen produced by said electrolyser;

a plurality of main anchoring chains arranged circumferentially around said ring foundation member, said plurality of main anchoring chains extending generally vertically downwards to the water body bottom;

a plurality of main bottom weights each respectively connected to a respective one of each of said plurality of main anchoring chains to respectively fasten it to the water body bottom and block vertical buoyancy thrust; and, a plurality of additional anchoring chains placed diagonally each respectively between said lower body and a respective one of said plurality of main bottom weights to offset and prevent horizontal shifting of said foundation member.

2. The wind turbine assembly for fresh or seawater bodies as claimed in claim 1, wherein:
said lower body cylindrical portion has a circular section.

3. The wind turbine assembly for fresh or seawater bodies as claimed in claim 1, wherein:
said lower body cylindrical portion has a polygonal section.

4. The wind turbine assembly for fresh or seawater bodies as claimed in claim 1, wherein:
said upper body cylindrical portion has a polygonal section.

5. A wind turbine assembly for fresh or seawater bodies as claimed in claim 1, further comprising:
said foundation member includes a reservoir for storing the hydrogen produced by said electrolyser.

6. The wind turbine assembly for fresh or seawater bodies as claimed in claim 1, wherein:
said plurality of top links include at least one rigid pipe.

7. The wind turbine assembly for fresh or seawater bodies as claimed in claim 1, wherein:
said plurality of top links include at least one chain.

8. A wind turbine assembly for fresh or seawater bodies as claimed in claim 1, further comprising:
a tank configured to store oxygen produced by said electrolyser, said tank located in said upper body.

9. A wind turbine assembly for fresh or seawater bodies as claimed in claim 1, further comprising:
said bottom weights include submerged hollow bodies filled with rubble and sand and buried in the sand below the bottom of the water body.

10. A wind turbine assembly for fresh or seawater bodies, comprising:

a submerged, horizontally disposed ring foundation member, said foundation member having positive buoyancy;

an upper body fastened centrally to said foundation member and extending upwards towards a water body surface, said upper body including a cylindrical portion, said upper body having positive buoyancy, said upper body including a top end;

a plurality of top links arranged circumferentially around and connected to said foundation member, said plurality of top links connected to said top end of said upper body to increase rigidity of the wind turbine assembly;

a tower connected to said top end of said upper body, said tower extending from said top end of said upper body to above the water body surface;

a nacelle connected to said tower, said nacelle receiving a turbine rotor, said nacelle housing a revolutions multiplier driven by said rotor;

said revolutions multiplier operatively connected to drive an electric generator;

an electrolyser configured to produce oxygen and hydrogen from the water body, said electrolyser powered by current from said electric generator, said electrolyser housed in said upper body;

a lower body fastened centrally to said foundation member and extending downwards toward the water body bottom, said lower body including a cylindrical portion, said lower body having negative buoyancy, and ballast filling said lower body and locating the center of gravity of the wind turbine assembly below the assembly center of rotation, said lower body having a bottom;

a second cylindrical body attached to said bottom of said lower body, said second cylindrical body extending downwards toward the water body bottom, said second cylindrical body including a reservoir for storing the hydrogen produced by said electrolyser;

a plurality of main anchoring chains arranged circumferentially around said ring foundation member, said plurality of main anchoring chains extending generally vertically downwards to the water body bottom;

a plurality of main bottom weights each respectively connected to a respective one of each of said plurality of main anchoring chains to respectively fasten it to the water body bottom and block vertical buoyancy thrust; and, a plurality of additional anchoring chains placed diagonally each respectively between said lower body and a respective one of said plurality of main bottom weights to offset and prevent horizontal shifting of said foundation member;

an anchoring rope connected to one of said main bottom weights;

a positive-buoyancy float connected to said anchoring rope, said positive-buoyancy float also connected to another bottom weight;

an additional anchoring rope connecting said float to said another bottom weight;

a fish farming cage, and a float rope connecting said fish farming cage to said float; and, an additional positive buoyancy float, said additional float respectively connected to respective additional bottom weights, and said additional float connected to said fish farming cage.

11. A wind turbine assembly for fresh or seawater bodies as claimed in claim 10, further comprising:
a dispenser configured to provide fish-food inside said cage.

12. A wind turbine assembly for fresh or seawater bodies as claimed in claim 10, further comprising:
said foundation member includes a reservoir for storing the hydrogen produced by said electrolyser.

13. The wind turbine assembly for fresh or seawater bodies as claimed in claim 10, wherein:
said plurality of top links include at least one rigid pipe.

14. The wind turbine assembly for fresh or seawater bodies as claimed in claim 10, wherein:
said plurality of top links include at least one chain.

15. A wind turbine assembly for fresh or seawater bodies as claimed in claim 10, further comprising:
a tank configured to store oxygen produced by said electrolyser, said tank located in said upper body.

16. A wind turbine assembly for fresh or seawater bodies as claimed in claim 10, further comprising:
said bottom weights include submerged hollow bodies filled with rubble and sand and buried in the sand below the bottom of the water body.

17. A wind turbine assembly for fresh or seawater bodies, comprising:
a submerged, horizontally disposed ring foundation member, said foundation member having positive buoyancy;
an upper body fastened centrally to said foundation member and extending upwards towards a water body surface, said upper body including a cylindrical portion, said upper body having positive buoyancy, said upper body including a top end;
a plurality of top links arranged circumferentially around and connected to said foundation member, said plurality of top links connected to said top end of said upper body to increase rigidity of the wind turbine assembly;
a tower connected to said top end of said upper body, said tower extending from said top end of said upper body to above the water body surface;
a nacelle connected to said tower, said nacelle receiving a turbine rotor, said nacelle housing a revolutions multiplier driven by said rotor;
said revolutions multiplier operatively connected to drive an electric generator;
an electrolyser configured to produce oxygen and hydrogen from the water body, said electrolyser powered by current from said electric generator, said electrolyser housed in said upper body;
a lower body fastened centrally to said foundation member and extending downwards toward the water body bottom, said lower body including a cylindrical portion, said lower body having negative buoyancy, and ballast filling said lower body and locating the center of gravity of the wind turbine assembly below the assembly center of rotation, said lower body having a bottom;
a second spherical body attached to said bottom of said lower body, said second spherical body extending downwards toward the water body bottom, said second spherical body including a reservoir for storing the hydrogen produced by said electrolyser;
a plurality of main anchoring chains arranged circumferentially around said ring foundation member, said plurality of main anchoring chains extending generally vertically downwards to the water body bottom;
a plurality of main bottom weights each respectively connected to a respective one of each of said plurality of main anchoring chains to respectively fasten it to the water body bottom and block vertical buoyancy thrust; and,
a plurality of additional anchoring chains placed diagonally each respectively between said lower body and a respective one of said plurality of main bottom weights to offset and prevent horizontal shifting of said foundation member.

18. A wind turbine assembly for fresh or seawater bodies as claimed in claim 17, further comprising:
said foundation member includes a reservoir for storing the hydrogen produced by said electrolyser.

19. A wind turbine assembly for fresh or seawater bodies as claimed in claim 17, further comprising:
a tank configured to store oxygen produced by said electrolyser, said tank located in said upper body.

20. The wind turbine assembly for fresh or seawater bodies as claimed in claim 17, wherein:
said lower body cylindrical portion has a polygonal section.

* * * * *